(12) United States Patent
Baucom et al.

(10) Patent No.: US 7,609,923 B2
(45) Date of Patent: Oct. 27, 2009

(54) PRETERMINATED FIBER OPTIC CABLE INCLUDING DOWNSTREAM SPLITTER

(75) Inventors: James L. Baucom, Conover, NC (US); David L. Dean, Jr., Hickory, NC (US); Jody L. Greenwood, Hickory, NC (US); Keith H. Lail, Connelly Springs, NC (US); Kenneth D. Temple, Jr., Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 123 days.

(21) Appl. No.: 11/234,886

(22) Filed: Sep. 26, 2005

(65) Prior Publication Data

US 2007/0071392 A1    Mar. 29, 2007

(51) Int. Cl.
*G02B 6/26* (2006.01)
*G02B 6/44* (2006.01)
(52) U.S. Cl. .......................................... 385/100; 385/48
(58) Field of Classification Search .................. 385/100
See application file for complete search history.

(56) References Cited

U.S. PATENT DOCUMENTS

| 4,928,310 | A * | 5/1990 | Goutzoulis et al. | 380/46 |
| 6,892,007 | B2 * | 5/2005 | Chen | 385/48 |
| 2004/0052463 | A1 * | 3/2004 | Chen | 385/48 |

* cited by examiner

*Primary Examiner*—Frank G Font
*Assistant Examiner*—Mary A El Shammaa
(74) *Attorney, Agent, or Firm*—Jeffrey S. Bernard; John L. Haack

(57) ABSTRACT

An optical splitter adjacent a downstream end of a fiber optic cable is operable for supplying an optical signal to at least one optical fiber from the downstream end of the fiber. A preterminated fiber optic distribution cable includes a first access location having an optical fiber termination fed from an upstream end of the cable and a second access location having an optical fiber termination fed from a downstream end of the cable, wherein the cable includes an upstream optical splitter for feeding a first set of optical fibers and a downstream optical splitter for back-feeding a second set of optical fibers. A fiber optic cable comprising a first set of optical fibers that are terminated and fed from an upstream end of the fiber optic cable and a second set of optical fibers that are terminated and fed from a downstream end of the fiber optic cable.

20 Claims, 3 Drawing Sheets

PRETERMINATED FIBER OPTIC CABLE INCLUDING DOWNSTREAM SPLITTER

BACKGROUND OF THE INVENTION

1. Field of the Invention

The present invention relates generally to increasing the number of optical fiber terminations that can be obtained from a fiber optic cable, and more specifically, to a preterminated fiber optic cable including an optical splitter positioned adjacent a downstream end of the cable that is operable for back-feeding optical fibers terminated at an upstream access location.

2. Technical Background

Optical fiber is increasingly being used for a variety of broadband applications including voice, video and data transmissions. As a result of the ever-increasing demand for broadband communications, fiber optic networks typically include a large number of access locations at which one or more optical fibers are terminated and branched from a distribution cable. These mid-span access locations provide a branch point from the distribution cable leading to an end user, commonly referred to as a subscriber, and thus, may be used to extend an optical communications network closer to the subscriber. In this regard, fiber optic networks are being developed that deliver "fiber-to-the-curb" (FTTC), "fiber-to-the-business" (FTTB), "fiber-to-the-home" (FTTH), or "fiber-to-the-premises" (FTTP), referred to generically as "FTTx."

Conventionally, in order to create a mid-span access location along a length of fiber optic distribution cable, a field technician was required to remove a portion of the cable sheath in the field at a convenient location along the length of an installed distribution cable. Once the sheath was removed, the technician accessed pre-selected optical fibers, severed the pre-selected optical fibers and removed a length of the optical fibers from the distribution cable. The removed length of optical fiber provided the field technician with adequate length to splice one or more optical fibers of a cable comprising a lesser amount of optical fibers than the distribution cable, typically termed a "drop cable," to the distribution cable optical fibers. After all splicing was completed, the access location was typically covered using a rigid enclosure designed to protect the splices and the exposed section of the distribution cable. This time consuming process was typically accomplished by a highly skilled field technician at a significant cost and under less than ideal working conditions.

With the development of FTTx, improved methods of creating mid-span access locations have been introduced that overcome the disadvantages of accessing optical fibers in the field. In one such approach, predetermined access locations are formed and drop cables are spliced to the distribution cable at a factory during the manufacturing of the cable. This "preterminated" cable, including the distribution cable, drop cables and any associated splice closures, are assembled and wound onto a cable reel to be delivered to an installation site. Accordingly, factory conditions for making high quality splices are utilized, thereby increasing splice quality and also reducing the expense and difficulty associated with field splicing. Further approaches eliminate the splicing of the drop cables to the distribution cable, and instead provide preterminated and/or pre-connectorized fiber optic distribution cables having one or more mid-span access locations formed at predetermined positions along the length of the cable. Each mid-span access location provides a plurality of readily accessible optical fibers that may be spliced or otherwise optically connected (e.g., via fiber optic connectors) to drop cables at the time of service installation following deployment of the distribution cable. Advantages of this type of factory-prepared cable assembly include a reduction in the field labor required to establish optical connections and improved quality of the splice connections.

In each of the cable assembly examples described above, a common element is the incorporation of one or more mid-span access locations positioned along the length of the cable that allows access to a plurality of terminated optical fibers of the distribution cable. In all examples, terminating one or a plurality of the optical fibers at a predetermined mid-span access location naturally results in the length of optical fiber downstream of the mid-span access becoming unusable, and therefore wasted. In other words, by terminating an optical fiber that runs the length of the distribution cable at a predetermined position along the length of the distribution cable in order to provide a branch point, the optical fiber must be cut, and the cut results in the portion of optical fiber downstream of the branch point being "dark" or "dead".

Accordingly, it would be desirable to provide a means for utilizing these downstream portions of optical fibers in order to increase the number of optical fiber terminations that can be obtained from a preterminated fiber optic cable. It would also be desirable to provide a preterminated fiber optic distribution cable including one or more predetermined access locations having factory preterminated optical fibers along a length of the distribution cable and a means for utilizing the downstream portions of the cut optical fibers to thereby increase the number of optical fiber terminations that can be obtained from the fiber optic cable. The terminated optical fibers that are re-used expand the capacity of the distribution cable by providing a greater number of optical fiber terminations potentially available from the same cable. The cut optical fibers may also be used as spare optical fiber terminations as needed. It would also be desirable to provide a preterminated fiber optic distribution cable including a downstream splitter, while still maintaining discrete fiber capability and achieving a low-profile for deployment over sheave wheels and through relatively small diameter conduits. Further, using the cut optical fibers has several obvious advantages including reduced cable material costs, reduced cable size and reduced splicing complexity.

SUMMARY OF THE INVENTION

In one aspect, the present invention provides an optical splitter positioned adjacent a downstream end of a fiber optic cable, such as, but not limited to, a fiber optic distribution cable, to back-feed downstream portions of optical fibers terminated at an upstream access location. The downstream portion of the optical fibers (i.e., from an upstream access location to the downstream end of the cable) is "back-lit" or "back-fed" by the downstream splitter to increase the number of optical fiber terminations that can be obtained from the fiber optic distribution cable, thereby providing additional terminated optical fibers for splicing, for example, additional drop cables onto the distribution cable. The downstream portions of the optical fibers may also be used as spare terminated optical fibers at an upstream cable access location, as needed. The optical splitter is positioned at about the downstream end of the fiber optic cable and may be optically connected to an input fiber that is in optical communication with an optical fiber of a feeder cable through an end-to-end optical fiber extending through the fiber optic distribution cable. The end-to-end optical fiber, for example from a fiber distribution hub, may be spliced if desired to a pigtail input fiber at the downstream end of the cable, for example in a splice closure. The splitter may be used with any fiber optic cable having at least one predetermined access location for providing access to at least one preterminated optical fiber.

In another aspect, the present invention provides a preterminated fiber optic cable including an optical splitter positioned adjacent a downstream end of the fiber optic cable that is operable for back-feeding one or more terminated optical fibers of the cable. In preferred embodiments, the "back-lit" or "back-fed" optical fibers are the downstream portions of end-to-end optical fibers that remain a part of the fiber optic cable after their respective upstream portions are terminated at a predetermined position along the length of the cable upstream from the end of the cable. In other words, by terminating one or more optical fibers prior to their respective downstream ends, referred to herein as "pre-terminating" or "preterminated," a length of optical fiber typically remains unused, and is thus wasted, within the cable. It is the unused (sometimes referred to in the art as "dark") length of optical fiber that may now be used to provide additional optical fiber terminations through the incorporation of a downstream optical splitter and a means for feeding the optical splitter, which in turn feeds the downstream optical fibers that would otherwise remain unused. The optical splitter may also be used to feed end-to-end optical fibers from the downstream end of the fiber optic cable. The optical splitter and the ends of the downstream optical fibers may be spliced as required at the downstream end of the cable within an appropriate enclosure, such as a splice closure, cabinet or optical connection terminal.

The preterminated fiber optic cable comprises at least one predetermined access location positioned along the cable length for providing access to at least one preterminated optical fiber. In preferred embodiments, the preterminated fiber optic cable comprises a plurality of access locations positioned at spaced apart locations along the length of the cable, thus providing multiple access locations (sometimes referred to as "tap points"), for joining at least one drop cable to the fiber optic cable in the field. The drop cable may be directly connected to the cable at the access location or may be indirectly connected to the access location, for example through a tether cable or an optical terminal. In preferred embodiments, the fiber optic cable includes one or more access locations for providing access to preterminated optical fibers fed from an upstream end of the cable, and one or more additional access locations for providing access to terminated optical fibers fed through an optical splitter positioned at a downstream end of the cable. The input optical signal of the downstream optical splitter is preferably supplied from a feeder cable through an end-to-end optical fiber within the fiber optic cable. The preterminated fiber optic cable may be wound upon a reel for distribution and deployment in aerial and buried applications, such as within a bore or conduit or around aerial installation pulleys. The preterminated cable may also be manufactured in a factory, thus eliminating the need for first installing a fiber optic cable and then performing multiple mid-span accesses, for example at a pole or pedestal in the field.

In yet another aspect, the present invention provides a communications system including a fiber optic cable comprising a first set of optical fibers that are preterminated and fed from an upstream end of the fiber optic cable, and a second set of optical fibers that are fed from a downstream end of the fiber optic cable. In a preferred embodiment, the first set of optical fibers and the second set of optical fibers are created when pre-selected end-to-end optical fibers are severed at a predetermined access location medially along the length of the cable, referred to herein as "pre-terminating" or "preterminated". The preterminated optical fibers are accessed at a predetermined access location and may be spliced or otherwise optically connected to fiber optic drop cables, a tether cable or a fiber optic cable leading to an optical connection terminal to which drop cables may be attached. The first and second sets of optical fibers are accessed from the fiber optic cable at one or more access points along the length of the cable, also referred to herein as a "mid-span access location". The first set of optical fibers is fed from an upstream end of the fiber optic cable through one or more feeder fibers, or through one or more feeder fibers and a splitter adjacent the upstream end of the cable. The second set of optical fibers is fed through an optical splitter positioned adjacent the downstream end of the fiber optic cable and having an input fiber supplied directly from a feeder cable through an end-to-end optical fiber of the fiber optic cable. The end-to-end optical fiber, for example from a fiber distribution hub, may be spliced to the splitter input fiber at the downstream end of the cable within a splice closure.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof. Additionally, the drawings and descriptions are meant to be illustrative and not limiting.

DETAILED DESCRIPTION OF THE PREFERRED EMBODIMENTS

Figure 1:
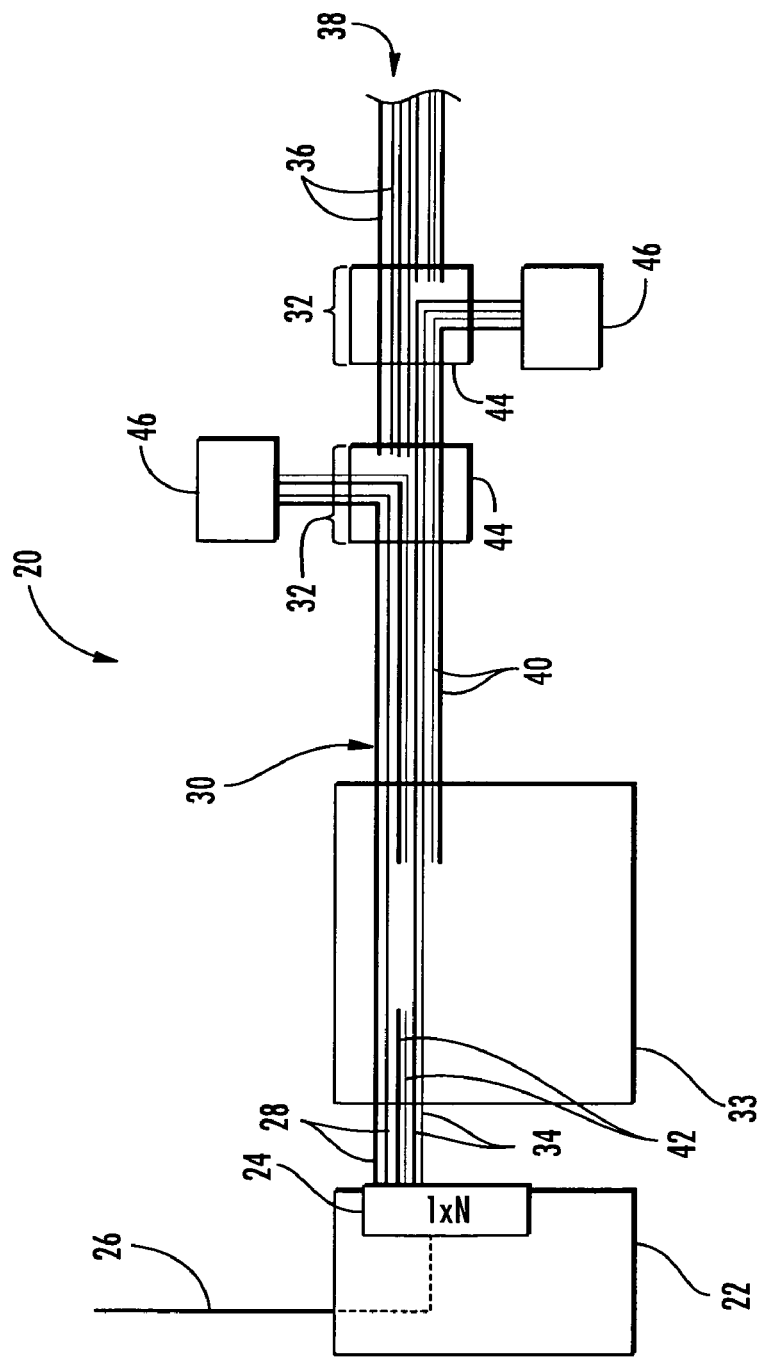
FIG. 1 is a schematic diagram illustrating a conventional factory-installed termination system including a fiber optic cable having one or more predetermined access locations along the length of the cable for providing access to one or more preterminated optical fibers.

Reference will now be made in detail to the present preferred embodiments of the invention, and examples of which are illustrated in the accompanying drawings. Whenever possible, the same reference numerals will be used throughout the drawings to refer to the same or like parts. Although specific factory-installed termination systems are shown throughout the figures as various embodiments for utilizing a downstream optical splitter to back-feed terminated optical fibers, it should be understood that the downstream optical splitter may be applied to any fiber optic cable for the purpose of increasing the number of optical fiber terminations that can be obtained from the cable.

Referring now to FIG. 1, the downstream optical splitter may be applied to any fiber optic cable, including fiber optic distribution cables having factory-installed termination systems, including one or more optical fibers terminated at a predetermined access location along the length of the cable. One example of a conventional factory-installed termination system is shown in FIG. 1 at reference number 20. The term "factory-installed termination system" is utilized herein to describe a fiber optic cable including at least one optical fiber that is accessed in the factory and terminated at a predetermined access location. While factory-installed termination systems are shown, it is envisioned that access locations may also be created in the field (e.g., mid-span access locations created by a field technician following deployment of a fiber optic cable). In preferred embodiments, the one or more accessed optical fibers are terminated at a predetermined medial position upstream of the end of the cable. The one or more preterminated optical fibers provide a branch point from the fiber optic cable and may be spliced or otherwise optically connected to a fiber optic drop cable, a tether cable or an optical connection terminal.

The conventional termination system shown includes a fiber distribution hub 22 containing a 1×N optical splitter 24. One or more feeder fibers 26 are received within the fiber distribution hub 22 are optically connected to the optical splitter 24 to serve as input fibers to the splitter. The one or more feeder fibers 26 feed a plurality of optical fibers 28 of a fiber optic cable, referred to herein as a "fiber optic distribution cable" 30. Typical access locations indicated by reference number 32 are created by accessing the distribution cable 30 at predetermined medial locations along the length of the cable. Reference number 33 schematically represents a splice closure adjacent the fiber distribution hub 22. The splice closure 33 is operable for splicing the output optical fibers from the splitter 24 to the optical fibers 28 of the distribution cable 30. However, the optical fibers 28 may be spliced or otherwise optical connected directly to the output optical fibers of the splitter 24, or directly to the splitter, within the fiber distribution hub 22. In an exemplary embodiment, the distribution cable 30 includes at least one tubular body, such as a buffer tube, disposed within an outer cable sheath, among other typical cable components. The distribution cable 30 provides stable performance over a wide range of temperatures and is compatible with any telecommunications grade optical fiber.

In fiber optic cables including one or more buffer tubes, to create a predetermined access location (or a field mid-span access location) requires that a section of the cable sheath is severed and removed to expose the buffer tubes within the distribution cable 30. The exposed length of the cable may vary. The exposed buffer tube length allows for about 15-40 inches of optical fiber to be withdrawn from the buffer tube for subsequent splicing, thereby providing sufficient slack fiber length for more than one splice attempt. For a given access location 32, appropriate buffer tubes may be accessed in multiple places using a standard No-Slack Optical Fiber Access Tool (NOFAT) available from Corning Cable Systems LLC of Hickory, N.C. The NOFAT tool is suitable for use in locations in which a minimal amount of cable slack can be obtained and the buffer tubes remain wrapped around the central member. The NOFAT tool provides a guide that allows a scalpel to slice a section of a buffer tube off without cutting completely through the buffer tube or the optical fibers disposed within the buffer tube. Starting at a first buffer tube access point, pre-selected optical fibers 28 are accessed and severed, and a suitable length of optical fiber is withdrawn from additional buffer tube access points.

The remaining, uncut optical fibers of the distribution cable 30 are managed and routed separately from the accessed and terminated optical fibers 28 such that they extend uninterrupted through the distribution cable and are available for accessing and terminating at further downstream access locations. The downstream optical fiber portions 36 created as a result of being severed from their upstream portions 28 (i.e., dark fiber portions) may still be utilized as a result of the addition of a downstream optical splitter positioned adjacent the downstream end 38 of the cable 30, as will be described in more detail below with respect to FIG. 2. Spare optical fibers 40 may also be made available to connect to additional fiber distribution hub optical fibers 42 in systems in which more distribution cable fibers are available than fiber distribution hub fibers.

Access locations 32 may be protected by any desired closure type, such as a conventional rigid enclosure or a flexible overmolded enclosure, represented generically at reference number 44. The enclosure is operable for substantially covering and sealing the access location 32 from the environment and protecting the accessed portion of the distribution cable 30, among other functions. The optical fibers preterminated at an access location 32 may be spliced directly to drop cables, spliced to pigtails and the connectors routed to optical connection terminals, or in preferred embodiments, spliced to a tether cable of an optical connection terminal 46, such as a multi-port terminal of the type available from the present assignee Corning Cable Systems LLC of Hickory, N.C. Preferably, the optical connection terminal 46 includes one or more connector ports adapted to receive optical fibers of a tether cable or connectorized optical fibers from inside the terminal 46, and connectorized fiber optic drop cables from outside the terminal 46. The terminal 46 may be configured to receive mating optical connectors in any suitable manner now known or hereafter devised. As is well known and understood in the art, each pre-connectorized drop cable comprises a flexible transport tube containing one or more optical fibers connected to an outside plant optical network terminal (ONT), for example a NID at a subscriber premises. The optical connection terminals 46 provide a convenient branch point in an optical network for a field technician to initially install and subsequently reconfigure optical connections between terminated optical fibers of a distribution cable and corresponding optical fibers of one or more drop cables in the network to provide communication services to a subscriber.

Figure 2:
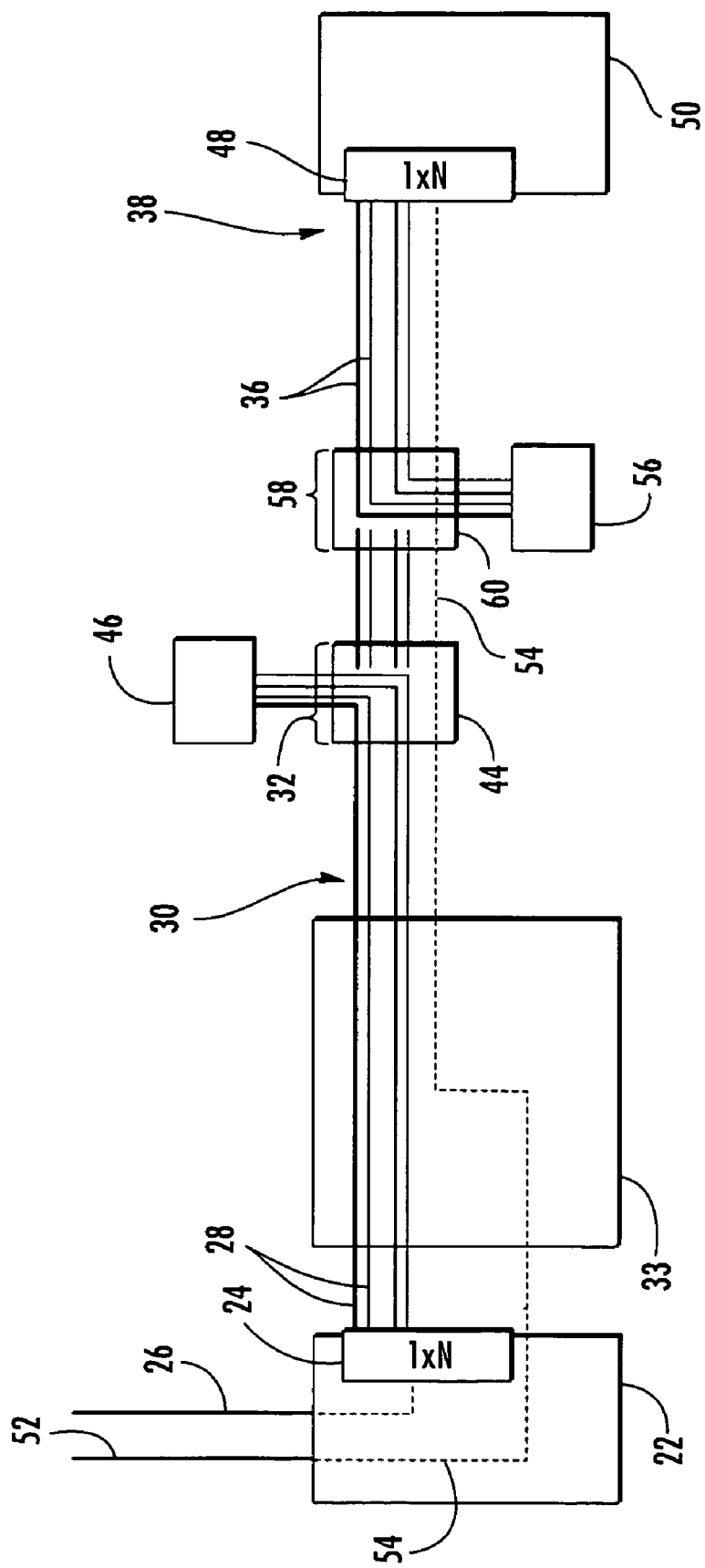
FIG. 2 is a schematic diagram illustrating a factory-installed termination system including a fiber optic cable having one or more predetermined access locations along the length of the cable and a downstream optical splitter operable for back-feeding optical fibers through an end-to-end optical fiber of the cable.

Referring to FIG. 2, the present invention provides an optical splitter 48 positioned adjacent a downstream end 38 of a fiber optic cable, such as, but not limited to, a fiber optic distribution cable 30, in order to back-feed the downstream portions of the severed optical fibers 36 remaining as a result of terminating optical fibers 28 at an upstream cable access location 32. The downstream portions of the optical fibers 36, i.e., from about the access location 32 to the downstream end of the cable 38, are back-fed by the optical splitter 48 in order to provide additional optical fiber terminations for optically connecting to additional drop cables to the distribution cable 30. The downstream portions of the optical fibers 36 may also be used as spare optical fiber terminations at the access locations, as needed. The optical splitter 48 is a known 1×N splitter and may be located within an enclosure 50, e.g., a splitter module, a coupler module, fiber distribution hub cabinet, closure, etc., positioned adjacent the downstream end 38 of the distribution cable 30.

The downstream splitter 48 may be supplied with an optical signal directly from a second feeder fiber 52 via an end-to-end optical fiber 54 of the fiber optic distribution cable 30. In the exemplary embodiment shown, the first feeder fiber 26 is operable for supplying an optical signal to the upstream optical splitter 24 and the upstream portions of the optical fibers 28. The upstream and downstream optical splitters 24 and 48 may be similar type splitters, and the feeder fibers 26 and 52 may be similar type feeder fibers, the only difference being the positioning of the splitters and the routing of the appropriate feeder fiber to its pre-selected splitter. The downstream optical fibers 36 are supplied with optical signals from the downstream splitter 48, which is supplied directly from the feeder fiber 52 through the end-to-end optical fiber 54 of the distribution cable 30. The end-to-end optical fiber 54 and the downstream optical fibers 36 are spliced or otherwise optically connected together (e.g., a splitter circuit) in any suitable manner at the downstream splitter 48 as required. The downstream optical fibers 36 may be active fibers or may be treated as spares and spliced into the network only as needed. If used as spares, the optical splitter 48 may be added after the initial network installation, or its fiber capacity may be increased based on additional optical connections to the distribution cable 30. For example, if a plurality of optical fibers is routed from the fiber distribution hub 22 as active fibers, it may increase the future expandability of the cable to splice both the upstream and downstream fibers in an oversized tether cable, e.g., an eight fiber tether cable for feeding a four fiber optical connection terminal. If expansion beyond the capabilities of a previously installed optical connection terminal is required, larger optical connection terminals can then be installed.

The downstream optical splitter 48 may be used to provide a preterminated fiber optic cable with an optical splitter positioned adjacent a downstream end of the fiber optic cable that is operable for back-feeding one or more optical fibers of the cable. The optical fibers may be terminated at a desired point along the cable length and back-fed from the downstream end 38 of the cable through the optical splitter 48. In preferred embodiments, the back-fed optical fibers 36 are the downstream portions of end-to-end optical fibers that remain a part of the fiber optic cable 30 after their respective upstream portions are severed and terminated from the cable at a predetermined access location along the length of the cable upstream of the end of the cable. Thus, by severing end-to-end optical fibers at one or more predetermined access locations along the length of the cable, a first set of optical fibers 28 that are pre-terminated and fed from an upstream end of the fiber optic cable 30 is created, and a second set of optical fibers 36 that are fed from a downstream end of the fiber optic cable 30 is created.

The first and second sets of optical fibers 28, 36, respectively, are created when the cable is accessed at a predetermined access location in either the factory or the field. Pre-selected optical fibers are accessed through the cable sheath and underlying cable components, and then severed as described above. An appropriate length of the first set of optical fibers 28 is withdrawn from the cable 30 and spliced as appropriate to a tether cable of an optical connection terminal 46. An appropriate length of the second set of optical fibers 36 is also withdrawn from the cable 30 and spliced as appropriate to a tether cable of another optical connection terminal 56. Both the first and second sets of optical fibers 28, 36 may be withdrawn at the same access location 32, or the second set of optical fibers 36 may be withdrawn from a second access location 58, as will be described. Once the fibers have been withdrawn and routed, the access location is protected using any closure type or overmolded enclosure. In various embodiments, the access location is created, fibers withdrawn and spliced, and the access location protected and sealed all in a factory-controlled environment. Tether cables and/or optical connection terminals 46, 56 may also be attached in the factory if so desired.

In an alternative embodiment, an appropriate length of the first set of optical fibers 28 is withdrawn from the cable 30 at a first upstream access location 32. The downstream second set of optical fibers 36 may be accessed at another access location 58 located downstream from the first access location 32. The downstream access location 58 is also protected and sealed using any desired enclosure type 60. Based on the total number of optical fibers of the distribution cable 30, multiple access locations for terminating any number of optical fibers can be created along the length of the cable. Thus, the fiber optic cable may include one or more access locations for providing access to preterminated optical fibers fed from an upstream end of the cable, and one or more access locations for providing access to terminated optical fibers fed through an optical splitter positioned at a downstream end of the cable. Terminated optical fibers of specific access locations are fed by either the upstream optical splitter 28 or downstream optical splitter 48 based on their position along the length of the cable and the direction from which the terminated optical fibers are withdrawn.

The terminated optical fibers may be spliced or otherwise optically connected to fiber optic drop cables, a tether cable, or a fiber optic stub cable leading to an optical connection terminal to which drop cables may be attached. In preferred embodiments, the preterminated fiber optic cable 30 includes a plurality of access locations 32 positioned at spaced apart locations along the length of the cable, thus providing multiple access locations, or tap points, for joining at least one drop cable to the fiber optic cable in the field. The cable assembly may be wound upon a reel for distribution and deployment in aerial and buried applications, such as within a bore or conduit or around aerial installation pulleys.

Figure 3:
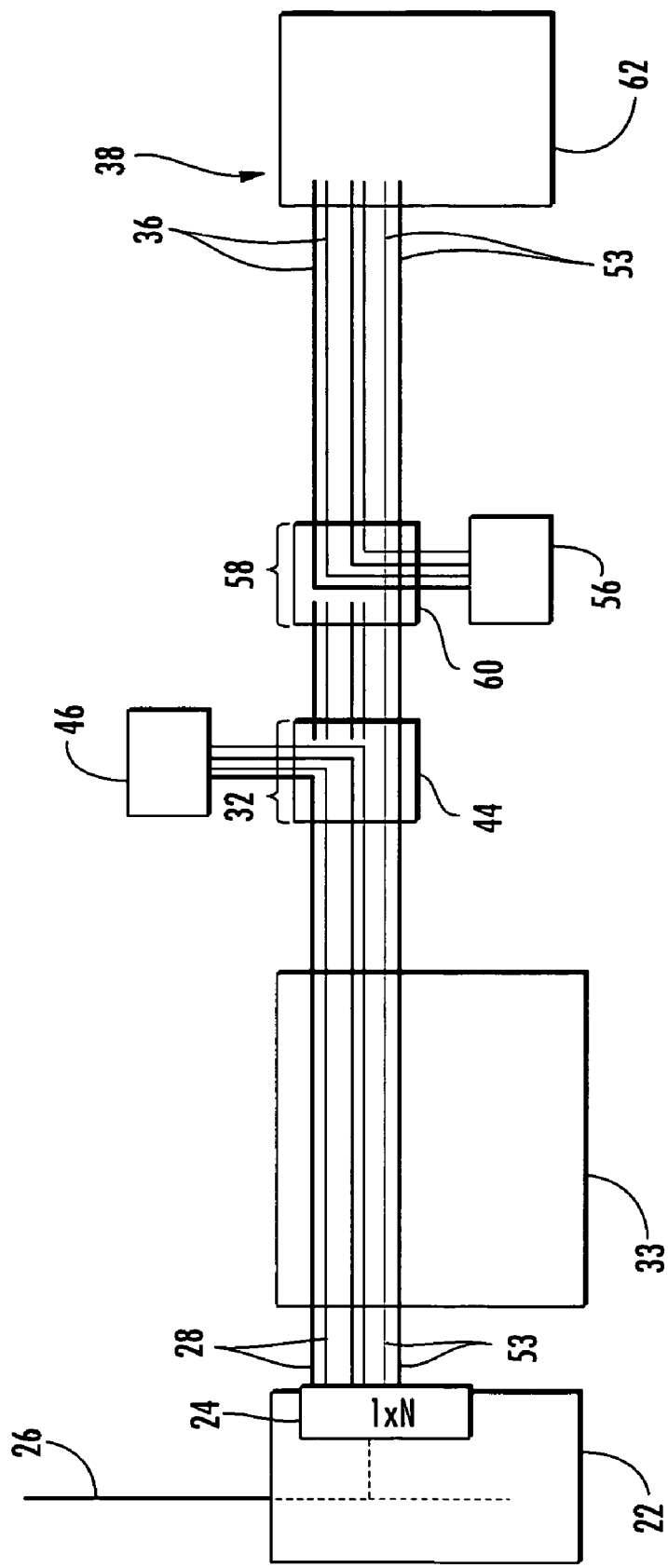
FIG. 3 is a schematic diagram illustrating a factory-installed termination system including a fiber optic cable having one or more predetermined access locations along the length of the cable and a downstream splice closure fed through one or more end-to-end optical fibers of the cable.

Referring to FIG. 3, another embodiment of a factory-installed termination system is shown in which end-to-end optical fibers 52 fed from the fiber distribution hub 22 are spliced as required at the downstream end of the cable 38 within a splice closure. In this embodiment, the downstream optical fibers 36 may be treated as spare optical fibers and used as needed, or may be spliced to the end-to-end optical fibers 53 within the splice closure 62 in order to provide additional terminated optical fibers. The optical splitter may be required in cable layouts in which the number of downstream optical fibers 36 is greater than the number of end-to-end optical fibers 53. In contrast to the cable layout shown in FIG. 2, the end-to-end feeder fibers 53 originate at the upstream optical splitter 24 that is fed by feeder fiber 26. Thus, in this embodiment, the upstream and downstream optical fibers may be fed by the upstream optical splitter 24.

The downstream splice closure 62 may be used to manage a portion of the optical connections in order to reduce the size of the fiber distribution hub closure 33. With a downstream splice closure 62 and one or more end-to-end optical fibers, a splice plan similar to the plan of the upstream closure 33 may be practiced in the downstream closure 62. For future connections, access may be performed in the downstream closure 62 instead of the upstream closure 33, this is particularly useful when the upstream closure 33 is a fiber distribution hub stub closure with multiple distribution cables. It may also be possible to use this approach in feeder factory-installed termination system cables where fiber distribution hub splitters are already installed in multiple locations along the cable length.

The termination systems described above including the downstream optical splitter 48 and/or downstream splice closure 62 may be added to the fiber optic cable in the factory to provide a factory-installed termination system. In cases of long distribution cable lengths, amplification of the optical signals may be required using amplification means known in the art. The upstream and downstream terminated optical fibers may be interconnected with an optical connection terminal, such as an overmolded multi-port optical connection terminal. The access locations themselves may also be overmolded. The term "overmolded" is intended to encompass any known molding procedure, for example injection molding or pour molding and refers to the method of pouring or injecting a molding material in a semi-viscous or liquid state into a molding tool in which connector ports, receptacles, optical connectors, optical fibers, a furcation, a plenum, a tether cable, etc. are positioned. The molding material fills in air spaces within the molding tool around the components positioned therein, and when allowed to cure, forms a rugged yet flexible protective housing with improved sealing performance as compared to conventional hollow plastic or metal housings defining an internal cavity. Suitable examples of overmolding materials include, but are not limited to, polyurethanes, silicones, thermoplastics, and like rugged, yet flexible materials.

Utilizing the typically unused downstream portions of optical fibers and optionally creating additional access locations increases the number of optical fiber terminations that can be obtained from a distribution cable, potentially reducing the cost and size of the distribution cable. Additional optical fiber terminations from a single distribution cable increases the number of drop cables that may be interconnected with the distribution cable. Providing additional access locations down the length of a distribution cable also increases the utility of the cable, allowing additional customizable length tether cables to be interconnected with the distribution cable in order to reach additional subscribers and mitigate span length differences that result from the improper positioning of an access location due to a span length measurement, cable manufacturing or cable deployment error in a fiber optic communications network following deployment of the distribution cable. Optical connection terminals may be mounted along the length of the distribution cable or at another location away from a distribution cable, such as a telephone pole, vault, hand-hole, cabinet or network connection terminal (e.g., aerial closure, buried closure, pedestal, etc.). In terms of splicing schemes, utilizing the downstream portion of optical fibers also allows for the use of stock cable designs versus other custom tapered solutions.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fiber optic cable comprising a plurality of optical fibers, at least one of the fibers being terminated at an upstream access location and preterminated at a downstream access location, and an optical splitter optically connected to at least one preterminated optical fiber adjacent a downstream end of the fiber optic cable, wherein the optical splitter is operable for back-feeding the at least one preterminated optical fiber from its downstream end.

2. The fiber optic cable according to claim 1, wherein the optical splitter is supplied with an optical signal from a feeder cable through one or more end-to-end optical fibers disposed within the fiber optic cable.

3. The fiber optic cable according to claim 1, wherein the optical splitter is operable for back-feeding a dark downstream portion of the at least one preterminated optical fiber.

4. The fiber optic cable according to claim 1, wherein the at least one terminated optical fiber is optically connected to a tether cable in optical communication with an optical connection terminal, and wherein the optical connection terminal is adapted to receive one or more drop cables.

5. A preterminated fiber optic distribution cable having a first access location comprising at least one terminated optical fiber supplied from an upstream end of the cable and a second access location comprising at least one preterminated optical fiber supplied from a downstream end of the cable, comprising:
    a first optical splitter positioned adjacent the upstream end of the fiber optic cable operable for feeding the at least one terminated optical fiber;
    a second optical splitter positioned adjacent the downstream end of the fiber optic cable operable for back-feeding the at least one preterminated optical fiber;
    wherein the at least one preterminated optical fiber that is back-fed is a severed downstream portion of an end-to-end optical fiber that remains a part of the fiber optic cable after the respective upstream portion is terminated at the first access location.

6. The preterminated fiber optic distribution cable according to claim 5, wherein the first optical splitter is supplied with at least one optical input signal from a feeder cable.

7. The preterminated fiber optic distribution cable according to claim 5, wherein the second optical splitter is supplied with at least one optical input signal from a feeder cable through at least one end-to-end optical fiber of the distribution cable.

8. The preterminated fiber optic distribution cable according to claim 5, wherein the second optical splitter is supplied with at least one optical input signal from a feeder cable through at least one end-to-end optical fiber fed from a fiber distribution hub comprising a feeder cable and spliced to the second optical splitter adjacent the downstream end of the distribution cable within a splice closure.

9. The preterminated fiber optic distribution cable according to claim 5, comprising a plurality of access locations fed from an upstream end of the cable and a plurality of access locations fed from a downstream end of the cable, the access locations being positioned at spaced apart locations along the length of the cable to provide access to a plurality of terminated and preterminated optical fibers adapted for optical interconnection with a plurality of drop cables.

10. The preterminated fiber optic distribution cable according to claim 9, wherein the plurality of terminated optical fibers are optically connected to tether cables of optical connection terminals, and wherein the optical connection terminals are adapted to receive one or more drop cables.

11. The preterminated fiber optic distribution cable according to claim 5, wherein the preterminated optical fiber terminated and accessed at the second access location is a spare optical fiber.

12. A fiber optic cable, comprising:
    a first set of optical fibers that are terminated and fed from an upstream end of the fiber optic cable;

a second set of preterminated optical fibers that are fed from a downstream end of the fiber optic cable; and an original end-to-end optical fiber, wherein the first set of terminated optical fibers and the preterminated second set of optical fibers are created when at least one of the original end-to-end optical fibers of the cable are severed at a predetermined access location along the length of the cable.

13. The fiber optic cable according to claim 12, wherein the first set of terminated optical fibers and the second set of preterminated optical fibers are accessed at different access locations and are optically connected to fiber optic drop cables or tether cables of optical connection terminals.

14. The fiber optic cable according to claim 12, wherein the first set of terminated optical fibers are fed from an upstream end of the fiber optic cable through a feeder fiber and a first optical splitter.

15. The fiber optic cable according to claim 14, wherein the second set of preterminated optical fibers are fed through a second optical splitter positioned adjacent the downstream end of the fiber optic cable.

16. The fiber optic cable according to claim 15, wherein the second optical splitter is supplied with an optical signal directly from a feeder cable through an end-to-end optical fiber of the fiber optic cable.

17. The fiber optic cable according to claim 12, wherein the second set of preterminated optical fibers are supplied with an optical signal through one or more end-to-end optical fibers fed from a fiber distribution hub and spliced to the second optical splitter adjacent the downstream end of the fiber optic cable within a splice closure.

18. The fiber optic cable according to claim 12, wherein the first set of terminated, optical fibers and the second set of preterminated optical fibers are terminated at the same access location and optically connected to a tether cable of an optical connection terminal adapted to receive one or more drop cables.

19. The fiber optic cable according to claim 12, wherein the first set of terminated optical fibers and the second set of preterminated optical fibers are terminated at different access locations and optically connected to a tether cable of an optical connection terminal adapted to receive one or more drop cables.

20. A method of supplying an optical signal to a downstream portion of a terminated optical fiber of a fiber optic cable, the method comprising:

providing a fiber optic cable comprising at least one end-to-end optical fiber disposed within the fiber optic cable between the upstream end, the downstream the cable having at least one terminated fiber and one preterminated fiber;

providing an optical splitter adjacent the downstream end of the cable, the optical splitter being in optical communication with the end-to-end optical fiber and the downstream portion of the terminated optical fiber; and providing an optical signal to the upstream end of the cable, wherein the at least one preterminated fiber is supplied.

* * * * *